(12) United States Patent
Kubota et al.

(10) Patent No.: US 11,240,733 B2
(45) Date of Patent: Feb. 1, 2022

(54) ACCESS CONTROL IN CONNECTED MODE, IDLE MODE, AND INACTIVE STATE

(71) Applicant: QUALCOMM Incorporated, San Diego, CA (US)

(72) Inventors: Keiichi Kubota, Tokyo (JP); Haris Zisimopoulos, London (GB); Lenaig Genevieve Chaponniere, La Jolla, CA (US); Masato Kitazoe, Hachiouji (JP); Gavin Bernard Horn, La Jolla, CA (US); Arvind Santhanam, San Diego, CA (US); Ajith Tom Payyappilly, San Diego, CA (US); Xipeng Zhu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/343,333

(22) PCT Filed: Sep. 22, 2017

(86) PCT No.: PCT/CN2017/103000
§ 371 (c)(1),
(2) Date: Apr. 18, 2019

(87) PCT Pub. No.: WO2018/086416
PCT Pub. Date: May 17, 2018

(65) Prior Publication Data
US 2019/0268824 A1    Aug. 29, 2019

(30) Foreign Application Priority Data
Nov. 11, 2016  (WO) ................ PCT/CN2016/105342

(51) Int. Cl.
*H04W 48/06* (2009.01)
*H04W 76/25* (2018.01)
(Continued)

(52) U.S. Cl.
CPC ....... *H04W 48/06* (2013.01); *H04W 28/0273* (2013.01); *H04W 28/0289* (2013.01);
(Continued)

(58) Field of Classification Search
CPC ..... H04W 48/06; H04W 48/08; H04W 76/25; H04W 76/27; H04W 28/0273;
(Continued)

(56) References Cited

U.S. PATENT DOCUMENTS 9,949,271 B2 *   4/2018   Hsu .......................... H04L 65/80
10,993,272 B2 *  4/2021   Johansson ............. H04W 72/04
(Continued)

FOREIGN PATENT DOCUMENTS

| CN | 104754690 A | 7/2015 |
| CN | 105103621 A | 11/2015 |

(Continued)

OTHER PUBLICATIONS

International Search Report and Written Opinion—PCT/CN2016/105432—ISA/EPO—Jul. 31, 2017.
(Continued)

*Primary Examiner* — Jay P Patel

(57) ABSTRACT

Certain aspects of the present disclosure relate to methods and apparatus for enabling access control in a connected mode, idle mode, and an inactive state. An exemplary method generally includes receiving access control information associated with one or more services used by the UE for communicating with the wireless communications network, receiving a request to transmit traffic using the one or more services, checking a type of the traffic against the access control information, and scheduling the traffic for transmission if the type of the traffic satisfies one or more criteria in the access control information based on the checking.

4 Claims, 8 Drawing Sheets

(51) Int. Cl.
*H04W 76/27* (2018.01)
*H04W 28/02* (2009.01)
*H04W 72/12* (2009.01)
*H04W 80/12* (2009.01)
*H04W 48/08* (2009.01)
*H04W 48/10* (2009.01)
*H04W 48/02* (2009.01)

(52) U.S. Cl.
CPC ....... *H04W 48/08* (2013.01); *H04W 72/1252* (2013.01); *H04W 76/25* (2018.02); *H04W 76/27* (2018.02); *H04W 80/12* (2013.01); *H04W 48/02* (2013.01); *H04W 48/10* (2013.01)

(58) Field of Classification Search
CPC ......... H04W 28/0289; H04W 72/1252; H04W 80/12; H04W 48/10; H04W 48/02
See application file for complete search history.

(56) References Cited

U.S. PATENT DOCUMENTS

| | | | |
|---|---|---|---|
| 2014/0254483 A1 | 9/2014 | Zisimopoulos | |
| 2014/0321416 A1* | 10/2014 | Pragada | H04W 76/14 370/329 |
| 2015/0119060 A1* | 4/2015 | Aoyagi | H04W 48/02 455/452.1 |
| 2015/0208293 A1* | 7/2015 | Zhang | H04W 36/0077 455/433 |
| 2015/0215845 A1 | 7/2015 | Pinheiro et al. | |
| 2015/0223106 A1* | 8/2015 | Van Phan | H04W 76/19 370/225 |
| 2015/0271708 A1 | 9/2015 | Zaus et al. | |
| 2016/0014673 A1 | 1/2016 | Jang et al. | |
| 2016/0066259 A1 | 3/2016 | Guo et al. | |
| 2016/0219493 A1* | 7/2016 | Kim | H04W 4/60 |
| 2016/0227469 A1* | 8/2016 | Kim | H04W 4/14 |
| 2016/0301779 A1* | 10/2016 | Cui | H04L 45/566 |
| 2017/0041854 A1* | 2/2017 | Kim | H04W 28/02 |
| 2017/0094586 A1* | 3/2017 | Lee | H04W 48/08 |
| 2017/0201939 A1* | 7/2017 | Lee | H04W 28/0231 |
| 2017/0331670 A1* | 11/2017 | Parkvall | H04W 52/0229 |
| 2018/0220302 A1* | 8/2018 | Chen | H04W 28/0289 |
| 2018/0234944 A1* | 8/2018 | Reial | H04W 68/06 |
| 2018/0279204 A1* | 9/2018 | Kim | H04W 52/0229 |
| 2019/0037475 A1* | 1/2019 | Zhang | H04W 48/06 |
| 2019/0098691 A1* | 3/2019 | Yu | H04W 76/11 |
| 2019/0150155 A1* | 5/2019 | Chatterjee | H04L 1/004 370/335 |
| 2019/0166553 A1* | 5/2019 | Ryoo | H04W 74/0833 |
| 2019/0174571 A1* | 6/2019 | Deenoo | H04W 76/11 |
| 2019/0182747 A1* | 6/2019 | Chun | H04W 48/08 |
| 2019/0191483 A1* | 6/2019 | Ryoo | H04W 76/27 |
| 2019/0246445 A1* | 8/2019 | Centonza | H04W 76/27 |
| 2019/0261426 A1* | 8/2019 | Lee | H04W 48/06 |
| 2019/0261457 A1* | 8/2019 | Jiang | H04W 24/10 |
| 2020/0068481 A1* | 2/2020 | Kim | H04W 36/00 |
| 2020/0187154 A1* | 6/2020 | Li | H04W 8/02 |
| 2020/0260402 A1* | 8/2020 | Adjakple | H04W 72/04 |
| 2020/0322853 A1* | 10/2020 | Tang | H04W 36/14 |

FOREIGN PATENT DOCUMENTS

| | | |
|---|---|---|
| CN | 105165065 A | 12/2015 |
| CN | 105302279 A | 2/2016 |
| CN | 105407106 A | 3/2016 |
| CN | 105612788 A | 5/2016 |
| CN | 106068660 A | 11/2016 |
| WO | 2014063360 A1 | 5/2014 |
| WO | WO-2016006948 A1 | 1/2016 |
| WO | WO-2016006980 A1 | 1/2016 |
| WO | 2016024832 A1 | 2/2016 |
| WO | 2016076603 A1 | 5/2016 |

OTHER PUBLICATIONS

International Search Report and Written Opinion—PCT/CN2017/103000—ISA/EPO—Nov. 17, 2017.
"3rd Generation Partnership Project; Technical Specification Group Services and System Aspects; Study on 3GPP PS Data Off; (Release 14)", 3GPP Standard; 3GPP TR 23.702, 3rd Generation Partnership Project (3GPP), Mobile Competence Centre ; 650, Route Des Lucioles ; F-06921 Sophia-Antipolis Cedex; France, vol. SA WG2. No. V1.1.0, Nov. 4, 2016 (Nov. 4, 2016), pp. 1-63, XP051173197, [retrieved on Nov. 4, 2016], Sections 6.2.3.2.2, 6.2.6.2, 6.3.1.1 and 6.2.5.1.
Supplementary European Search Report—EP17869284—Search Authority—Munich—Mar. 26, 2020.

* cited by examiner

US 11,240,733 B2

ACCESS CONTROL IN CONNECTED MODE, IDLE MODE, AND INACTIVE STATE

CROSS-REFERENCE TO RELATED APPLICATIONS

This application is a national stage application under 35 U.S.C. 371 of PCT/CN2017/103000, filed Sep. 22, 2017, which claims benefit of International Application No. PCT/CN2016/105432, filed Nov. 11, 2016, both of which are incorporated herein by reference in their entireties.

FIELD

The present disclosure relates generally to communication systems, and more particularly, to methods and apparatus for access control in a connected mode, idle mode, and an inactive state.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an e NodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example. 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure generally relate to methods and apparatus for enabling access control in a connected mode, an idle mode, and an inactive state.

Certain aspects of the present disclosure provide a method for wireless communications by a user equipment (UE). The method generally includes receiving access control information associated with one or more services used by the UE for communicating with the wireless communications network, receiving a request to transmit traffic using the one or more services, checking a type of the traffic against the access control information, and scheduling the traffic for transmission if the type of the traffic satisfies one or more criteria in the access control information based on the checking.

Certain aspects of the present disclosure provide an apparatus for wireless communications by a user equipment (UE). The apparatus generally includes at least one processor configured to receive access control information associated with one or more services used by the UE for communicating with the wireless communications network, receive a request to transmit traffic using the one or more services, check a type of the traffic against the access control information, and schedule the traffic for transmission if the type of the traffic satisfies one or more criteria in the access control information based on the checking.

Certain aspects of the present disclosure provide an apparatus for wireless communications by a user equipment (UE). The apparatus generally includes means for receiving access control information associated with one or more services used by the UE for communicating with the wireless communications network, means for receiving a request to transmit traffic using the one or more services, means for checking a type of the traffic against the access control information, and means for scheduling the traffic for transmission if the type of the traffic satisfies one or more criteria in the access control information based on the checking.

Certain aspects of the present disclosure provide a non-transitory computer-readable medium for wireless communications by a user equipment (UE). The non-transitory computer-readable medium generally includes instructions that, when executed by at least one processor, configure the at least one processor to receive access control information associated with one or more services used by the UE for communicating with the wireless communications network, receive a request to transmit traffic using the one or more services, check a type of the traffic against the access control information, and schedule the traffic for transmission if the type of the traffic satisfies one or more criteria in the access control information based on the checking.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
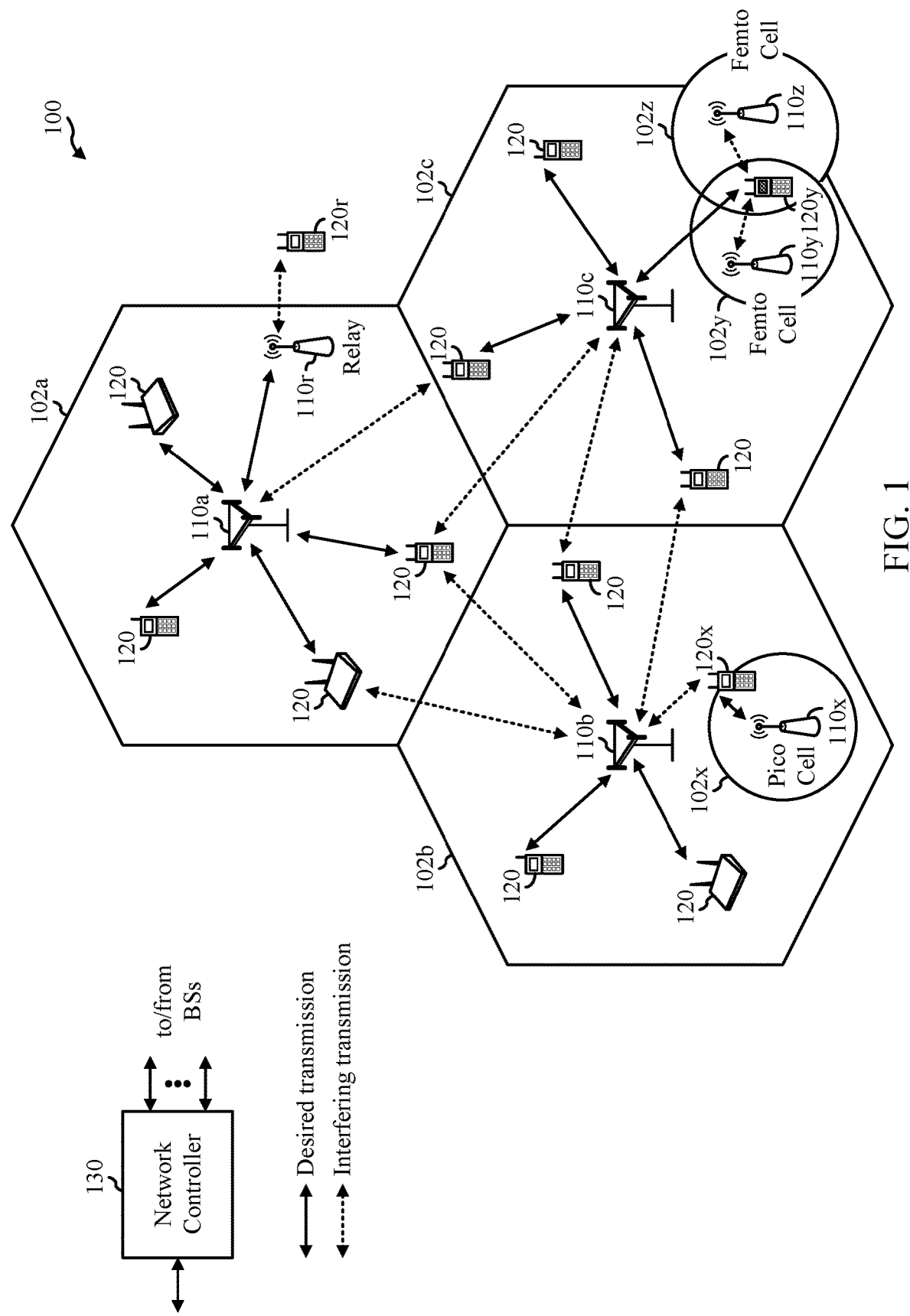
FIG. 1 is a block diagram conceptually illustrating an example telecommunications system, in accordance with certain aspects of the present disclosure.

Aspects of the present disclosure provide apparatus, methods, processing systems, and computer readable mediums for multi-slice networks, such as new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe.

A light connection (LC) for long term evolution (LTE) and an radio resource control inactive (RRC_INACTIVE) state for new radio (NR) have been proposed in 3GPP standards. Due to the energy savings gain associated with these operating states, it may be beneficial to design the LTE LC and NR RRC_INACTIVE such that UEs can operate in these states for long durations. However, allowing UEs to remain in these states for long durations inherently means that, in certain circumstances, there could be large number of UEs in a given cell all trying to access at the same time (e.g., in emergency situations, such as an earthquake).

Thus, aspects of the present disclosure provide techniques to help alleviate this potential issue, for example, through the use of access control mechanisms, such as access class barring. However, existing access control mechanisms, as explained below, may not be compatible with the LC and NR RRC_INACTIVE state requirements.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various wireless communication networks such as CDMA, TDMA. FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies, such as a 5G nextgen/NR network.

EXAMPLE WIRELESS COMMUNICATIONS SYSTEM

FIG. 1 illustrates an example wireless network 100, such as a new radio (NR) or 5G network, in which aspects of the present disclosure may be performed. For example, techniques presented herein may be used for enabling access control in a connected mode, an idle mode, and an inactive state, as described in greater detail below.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP. NR BS. NR BS, gNB, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed, employing a multi-slice network architecture.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a. 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another. e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

NR may utilize OFDM with a CP on the uplink and downlink and include support for half-duplex operation using TDD. A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or one or more DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and one or more DUs. A NR BS (e.g., gNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
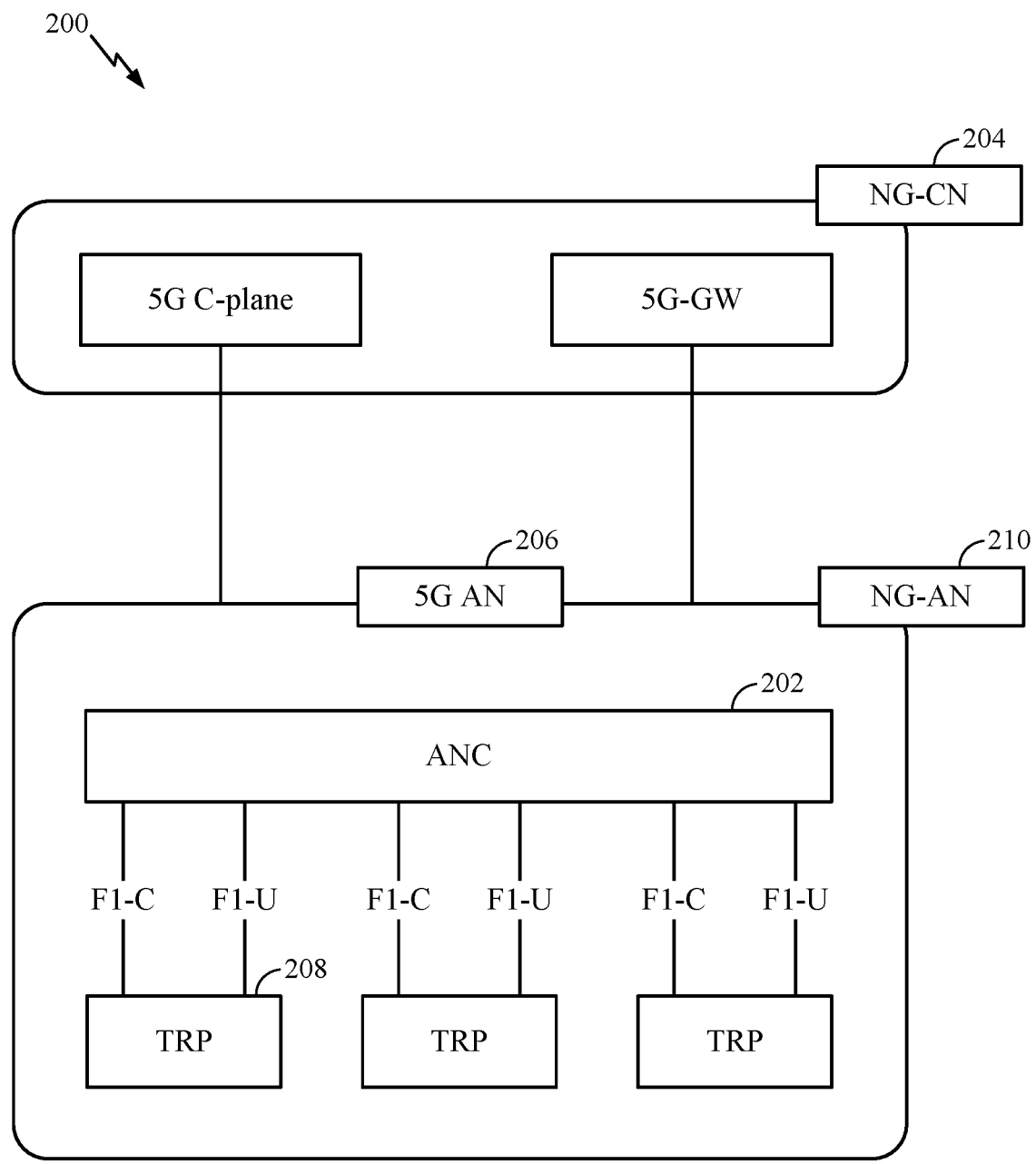
FIG. 2 is a block diagram illustrating an example logical architecture of a distributed RAN, in accordance with certain aspects of the present disclosure.

FIG. 2 illustrates an example logical architecture 200 of a distributed radio access network (RAN), which may be implemented in the wireless communication system illustrated in FIG. 1. A 5G access node 206 may include an access node controller (ANC) 202. The ANC may be a central unit (CU) of the distributed RAN. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, gNB, or some other term). As described above, a TRP may be used interchangeably with "cell" and may refer to a region where a same set of radio resources are available throughout the region.

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The logical architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
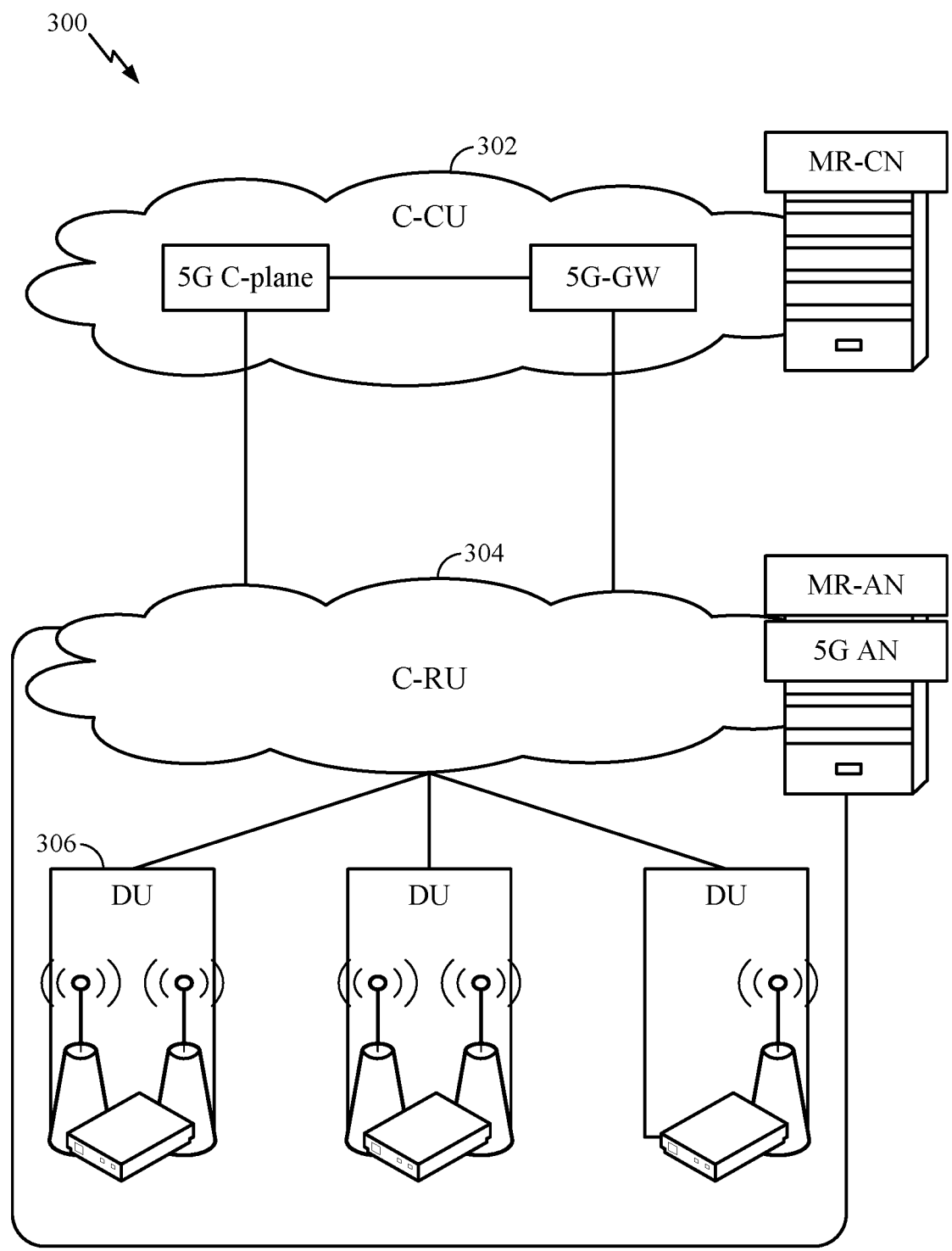
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
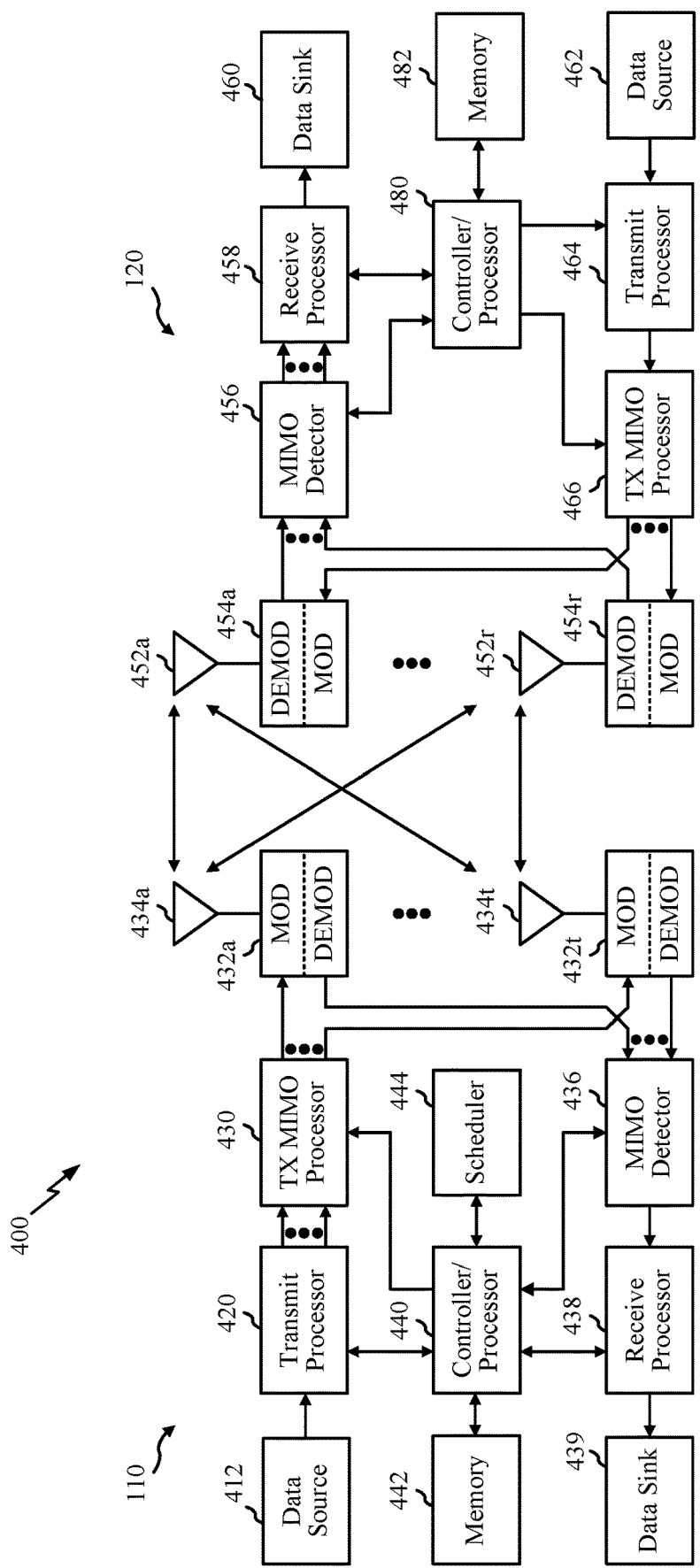
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 9-10.

According to aspects, for a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH). Physical Control Format Indicator Channel (PCFICH). Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS. SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIG. 12, and/or other processes for the techniques described herein. The processor 480 and/or other processors and modules at the UE 120 may also perform or direct, e.g., the execution of the functional blocks illustrated in FIGS. 8 and/or 11, and/or other processes for the techniques described herein. The memories 442 and 482 may store data and program codes for the BS 110 and the UE 120, respectively. A scheduler 444 may schedule UEs for data transmission on the downlink and/or uplink.

Figure 5:
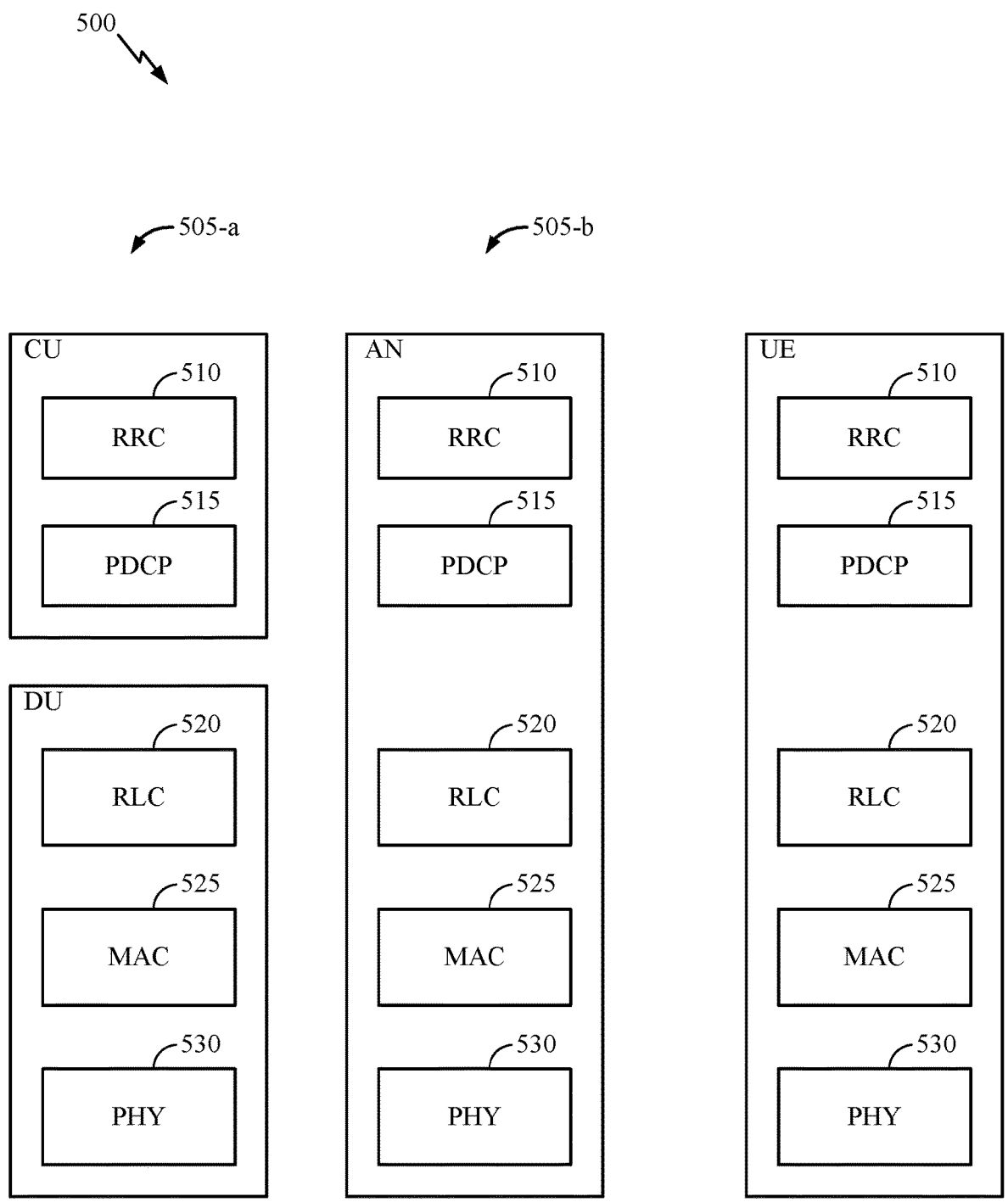
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs. CUs. and/or one or more DUs) or a UE.

A first option 505-*a* shows a split implementation of a protocol stack, in which implementation of the protocol stack is split between a centralized network access device (e.g., an ANC 202 in FIG. 2) and distributed network access device (e.g., TRP/DU 208 in FIG. 2). In the first option 505-*a*, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-*b* may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
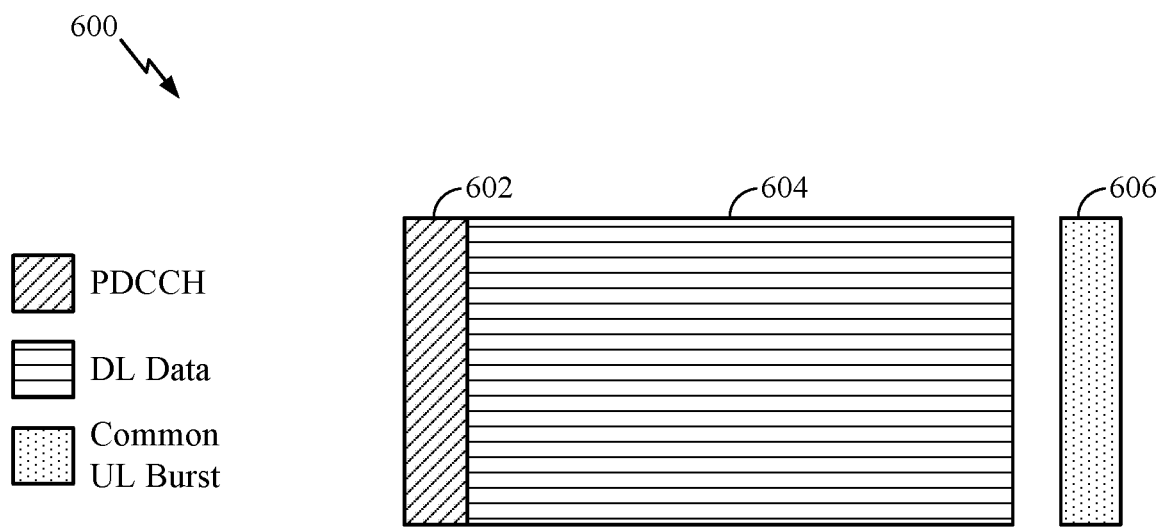
FIG. 6 illustrates an example of a DL-centric subframe, in accordance with certain aspects of the present disclosure.

FIG. 6 is a diagram 600 showing an example of a DL-centric subframe, which may be used to communicate in the wireless network 100. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
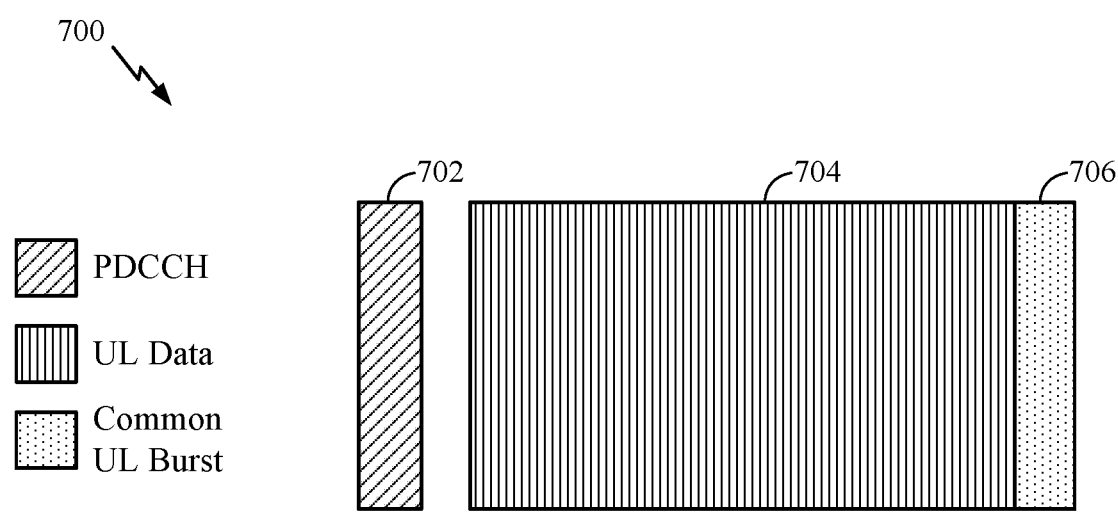
FIG. 7 illustrates an example of an UL-centric subframe, in accordance with certain aspects of the present disclosure.

FIG. 7 is a diagram 700 showing an example of an UL-centric subframe, which may be used to communicate in the wireless network 100. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services. UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs. or to initiate a change of serving cell for one or more of the UEs.

EXAMPLE ACCESS CONTROL IN CONNECTED MODE, IDLE MODE, AND INACTIVE STATE

A light connection (LC) for long term evolution (LTE) and an radio resource control inactive (RRC_INACTIVE) state for new radio (NR) have been proposed in 3GPP standards. The LC and RRC_INACTIVE states are similar in terms of energy savings, user equipment (UE) context, and UE mobility. For example, a Long DRX cycle identical to the RRC_IDLE mode may be applied in LC and RRC_INACTIVE states as they aim to offer the identical energy saving gain to the RRC_IDLE one. Further, in an LC or RRC_INACTIVE state, the UE context is stored in the radio access network (RAN) (e.g., eNB for LTE and gNB for NR). Additionally, in these states, a UE performs UE based mobility (i.e. cell reselection) where the UE determines whether it needs to switch from one gNB to another gNB. For NR. UL based mobility may optionally be used in the RRC_INACTIVE state.

In some cases, it has been proposed to replace RRC_IDLE mode with the new energy saving state (LC or RRC_INACTIVE) as they offer almost identical energy saving gain to the RRC_IDLE one. Therefore, it may be beneficial to design the LTE LC and NR RRC_INACTIVE such that UEs can operate in these states for long durations. However, allowing UEs to remain in these states for long durations inherently means that, in certain circumstances, there could be large number of UEs in a given cell all trying to access at the same time (e.g., in emergency situations, such as an earthquake).

Thus, aspects of the present disclosure provide techniques to help alleviate this potential issue, for example, through the use of access control mechanisms, such as access class barring. However, existing access control mechanisms, as explained below, may not be compatible with the LC and NR RRC_INACTIVE state requirements.

For example, one issue that arises with using existing access control mechanisms with an NR RRC_INACTIVE state is due to the fact that the access class barring (ACB) check is only performed when the non-access stratum (NAS) requests a radio resource control (RRC) connection. However, NAS-request-based access control does not happen in connected mode today (e.g., since a UE may start data transmission without performing any NAS procedure), which means that RRC needs to be aware about the type of the UL data to be transmitted and apply ACB based on the knowledge. For example, the RRC may need to know the type of user plane data. In some cases, NAS provides detailed information to RRC when requesting an RRC connection, such as data or signaling, emergency call, CSFB, what the connection request is subject to (ACDC, EAB). The RRC, in turn, uses this information to decide which ACB to apply. According to aspects, a larger issue is what occurs after access is barred based on ACB check. For example, in this case, the UE will need to throttle (or block) the signaling or data that it's trying to transmit. According to certain aspects, these issues may be present in the types of access control mechanisms described below.

A first type of access control mechanism is known as access class barring (ACB). In ACB, the RAN restricts network access attempts per pre-defined access class. A negative aspect of ACB, for example, in relation to an LTE LC and/or NR RRC_INACTIVE state is that ACB may only apply to RRC connection establishment attempts in idle mode but not to new session establishment attempts or new data transmissions in connected mode. In other words, ACB cannot be used to restrict a new session/flow establishment attempts and a new data transmission attempts via the already established session/connection/flow.

Another type of access control mechanism is known as Service Specific Access Control (SSAC), which was designed to allow operators to add "additional" access restrictions for multimedia telephony (MMTEL) calls as compared to that for regular, best effort data. A typical use case of SSAC occurs, for example, during a scenario of emergency, such as a natural disaster scenario, where an operator wants to allow user data for people to send messages while disallowing voice over LTE (VoLTE). The check for SSAC is done at the internet protocol (IP) multimedia subsystem (IMS) layer upon session initiation. The SSAC check is performed regardless of whether the UE is in idle or connected mode. A negative aspect of SSAC, for example, with respect to an LTE LC and/or NR RRC_INACTIVE state is that SSAC applies only to new session establishment but cannot restrict new data transmissions for an already-established session.

Another type of access control mechanism is known as Application specific Congestion control for Data Communication (ACDC). The idea behind ACDC is that there needs to be services, such as the disaster message board service or the disaster voice messaging service, that are used to confirm the safety status of families, relatives, or community members in situations of disaster. Those services have been used in several occasions and recognized as essential to support general public. A highly congested situation may be caused by natural disaster or public events or triggered by any of a number of reasons. In order to free up network resources based on operator-defined situation (e.g. in RAN/CN that is congested or about to be congested), it would be useful to have a mechanism (subject to regional regulations) that is able to allow/prohibit communication initiation of operator-defined particular applications in the UE.

The way ACDC works is that when access is barred due to ACDC in idle mode, the NAS layer in the UE does not send a service request (SR) or tracking area update (TAU) that would have triggered the RRC connection setup to send application data. However, this same mechanism does not work for connected mode (no SR/TAU in that case), and there is currently no way for NAS to tell the application to stop sending data. Further, it is not easy to extend the principle of ACDC to applications which do not have the concept of session.

Thus, aspects of the present disclosure provide an access barring mechanism for NR and/or LTE that may be applied in both idle and connected modes. According to aspects, the access barring mechanism presented herein may be performed in a similar fashion as an ACB check is performed at NAS/upper layers and access stratum (AS), where NAS only sees those RRC connection establishment requests (e.g., in and idle state) or UL data for transmission (e.g., in a connected state) that have passed the ACB check at an upper layer.

According to aspects, the connected mode throttling of certain (types of) applications is also worth considering for NR, particularly now that NR is moving away from the NAS controlled dedicated bearers. Thus, aspects of the present disclosure provide a mechanism applied in the context of User Plane Congestion management (UPCON) where when AS is congested, AS is able to restrict UE access to the RAN not only for a call setup attempt but also for NAS signaling such as NAS registration (TAU).

Figure 8:
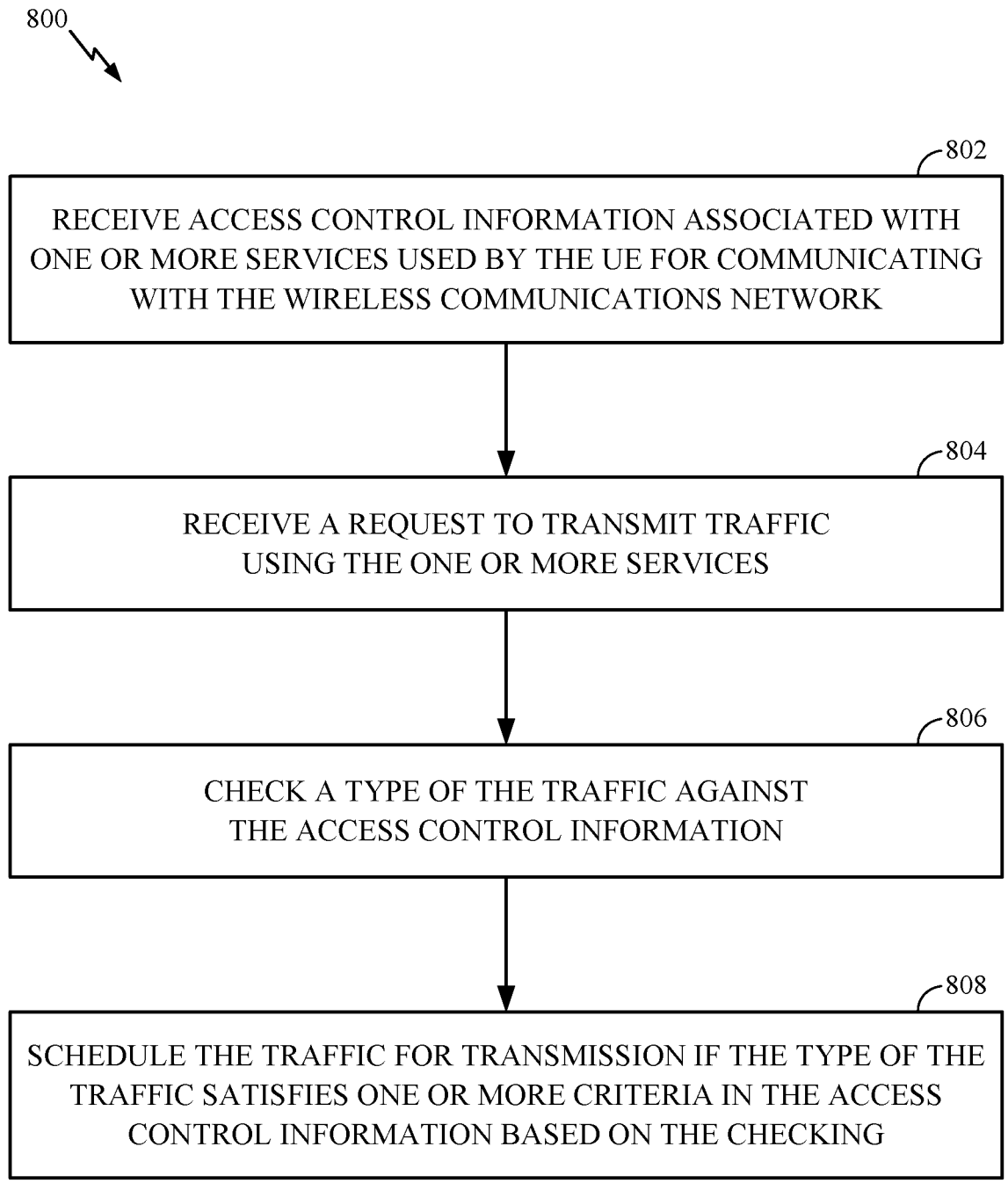
FIG. 8 illustrates example operations for wireless communications, in accordance with certain aspects of the present disclosure.

FIG. 8 illustrates example operations 800 for wireless communications, for example, for allowing access control in both idle and connected states. According to certain aspects, operations 800 may be performed by any suitable wireless communications device, such as an user equipment (e.g., AT 116, 250).

The wireless communications device may include one or more components as illustrated in FIGS. 2 and 3 which may be configured to perform the operations described herein. For example, the antenna 252, receiver/transmitter 254, TX data processor 238, modulator 280, processor 270, and/or memory 272 of the access terminal 250, as illustrated in FIG. 2, may perform the operations described herein.

Operations 800 begin at 802 by receiving access control information associated with one or more services used by the UE for communicating with the wireless communications network. At 804, the UE receives a request to transmit traffic using the one or more services. At 806, the UE checks a type of the traffic against a traffic exemption list in the access control information. At 808, the UE schedules the traffic for transmission if the type of the traffic satisfies one or more criteria in the access control information based on the checking.

According to certain aspects, operations 800 may encompass a combination of the example solutions presented below, which enable an access control mechanism that may be used for both idle and connected states.

For example, a first solution may involve an application enforcing access control itself. However, this solution may require modification of each application and may not by easily enforced by a standards body.

A second solution may involve a modem in the UE enforcing access control, where data received from the application is either dropped or buffered in the modem when access is barred. A benefit of this second solution is that it does not require application modification and can be enforced by a standard. However, this solution requires cooperation between the Higher Layer Operation System (HLOS) in the UE and the modem in the UE. For example, the first time an application opens a socket at the HLOS for the purpose of sending data, the HLOS opens a port for that application, and also provides the modem with the port number along with the App OS ID. The modem maintains the mapping of port numbers with App OS IDs.

A third solution may involve HLOS enforcing access control. However this solution is not easily enforced by a standard.

According to certain aspects, for the second and third solutions presented above, these solutions may be defined in NAS by the UE "creating" uplink (UL) traffic flow templates (TFTs) spontaneously (e.g., when "PS Data off" (packet switched data off) is activated or ACDC is activated) and replacing the UL TFTs provided from the network as long as this "condition" (i.e. PS Data off, ACDC) applies. According to aspects, these UL TFTs may allow exempt services and "block" non-exempt services. In some cases, the UL TFT for "PS Data off" and/or ACDC may be provided by the network and, when the condition arises, the UE uses them.

According to certain aspects, the second and third solutions may pertain to a packet switched (PS) DATA OFF EXEMPT based solution and/or a ACDC-based solution, for example, on an application-type basis.

For example, under a "PS DATA OFF EXEMPT" based solution, the UE may be configured to receive (e.g., using Open Mobile Alliance Device Management/Universal Integrated Circuit Card (OMA DM/UICC)) access control (AC) information, including a traffic exempt list indicating a type of traffic (e.g., such as PS DATA OFF EXEMPT applications) that may be scheduled for transmission. In some cases, the access control information may comprise a blocked traffic list indicating a type of traffic that should be blocked from scheduling.

According to certain aspects, upon receiving the access control information, the UE activates PS DATA and may report the activation to the core network (CN) using a protocol configuration options (PCO). The UE may then receive an acknowledgement (ACK) for the activation from the packet gateway (PGW).

In some cases, the UE may then receive a request to transmit traffic using one or more services. In response, the UE checks a type of the traffic requested to be sent against the access control information and blocks all traffic (e.g., at its protocol stack) associated with a traffic type, or application, that is not part of the traffic exempt list (i.e., the PS DATA OFF EXEMPT) or that is listed in the blocked traffic list.

In some cases, the AC information specific to LC or RRC_INACTIVE is signaled via either system information or an RRC unicast message to the UE. In some cases, the AC information includes the exempt list and ACB parameters. According to aspects, the new AC is activated once UE receives it from RAN. According to aspects, UE checks if the traffic generated in LC/RRC_INACTIVE state is associated with one of the flow/application in the exempt list and determines whether throttle or block the traffic.

According to aspects, for the ACDC-based solution, the access control information may comprise a traffic exempt list indicating a number of ACDC-exempt applications or a blocked traffic list indicating a number of blocked ACDC applications. According to aspects, upon receiving the access control information, the gNB communicating with the UE activates ACDC and may report the ACDC activation using a PCO to the core network. Accordingly, upon receiving a request to transmit traffic, the UE may check the type of the traffic against the access control information and may block all traffic (e.g., at the protocol stack in the UE) associated with a traffic type, or application, that is not part of the traffic exempt list (i.e., ACDC exempt list) or that is listed in the blocked traffic list.

According to aspects, as noted, the traffic exempt list and/or blocked traffic list may include an indication of types of traffic (e.g., applications) which are either allowed or blocked (respectively). In response to a request to transmit traffic associated with a particular application type, the UE may identify the application type either by the application layer in the UE directly telling the UE's modem of the application type or through the use of a UL filter. According to aspects, UL filters may identify the application type/category based on at least one of a Flow-ID, an application identifier (App ID) associated with a port number for the traffic type requested to be scheduled, or a Token associated with the traffic type requested to be scheduled.

According to certain aspects, a fourth solution for enabling access control for both idle and connected states may involve enforcing access control only when a new traffic flow is generated by the UE. For example, a new traffic flow may be generated by a UE when data not associated with any existing traffic lows is generated. According to aspects, if this occurs, the RAN may establish a new DRB if the new traffic flow's QoS requirement is different from the ones associated with the already established DRBs. Accordingly, if a new traffic low is generated, the RAN may need to perform some heavy processing and so it may be beneficial to apply the access control when that happens.

This solution may be beneficial as NAS procedure is involved for the new flow's traffic so the AC mechanism can be centralized in NAS. However, the data for the existing flows may not be able to be access controlled by this.

Figure 9:
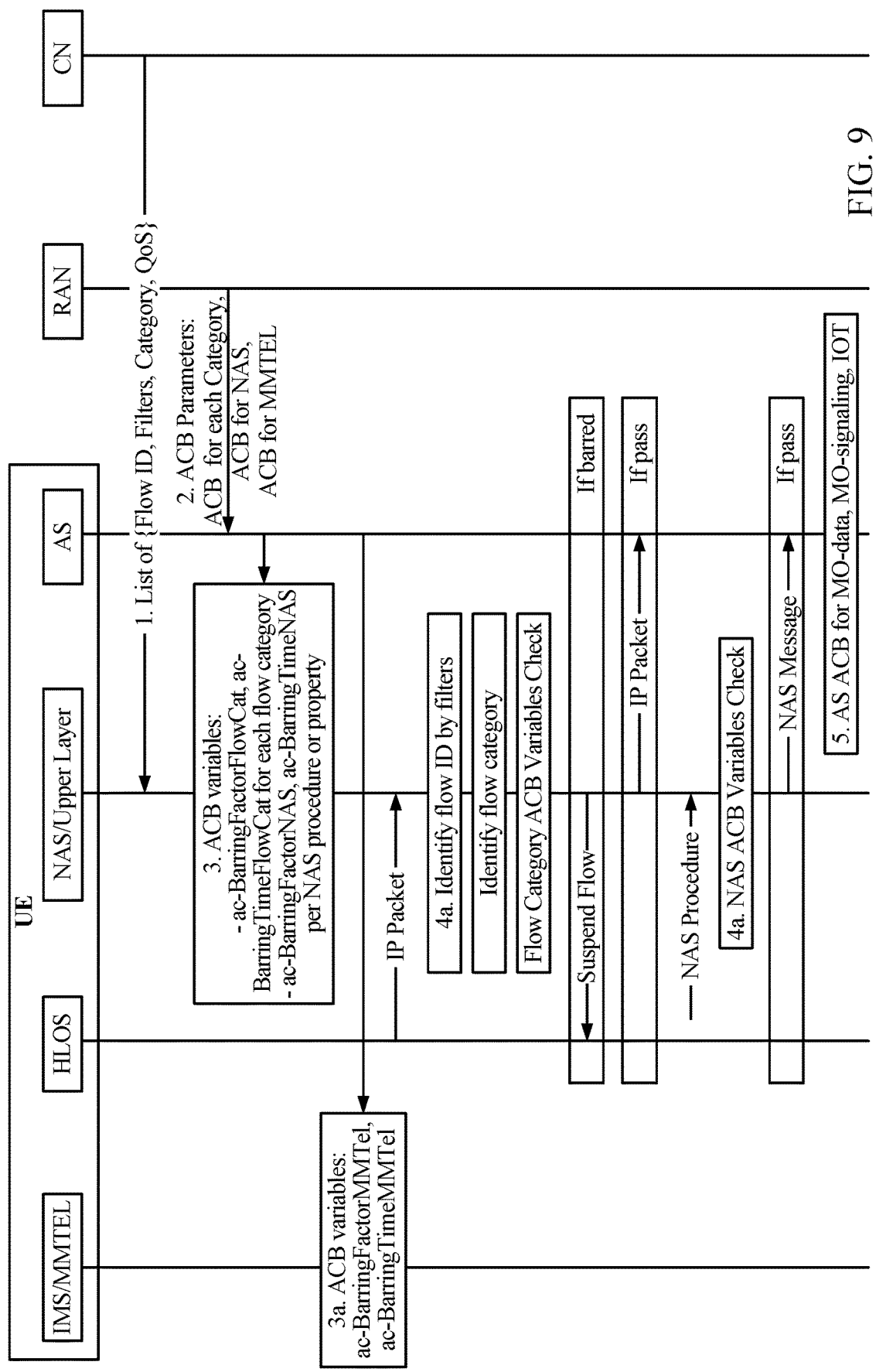
FIG. 9 is an example call flow illustrating an example access control mechanism, in accordance with certain aspects of the present disclosure.

According to certain aspects, similar to the second and third solutions above, the fourth solution may also pertain to a packet switched (PS) DATA OFF EXEMPT based solution and/or a ACDC-based solution, albeit on a traffic flow basis. An example of this solution is illustrated in FIG. 9 and described in greater detail below.

For example, under a "PS DATA OFF EXEMPT" based solution, the UE may be configured to receive (e.g., using Open Mobile Alliance Device Management/Universal Integrated Circuit Card (OMA DM/UICC)) access control information including a traffic exempt list indicating a type of traffic, such as PS DATA OFF EXEMPT flows, that may be scheduled for transmission. In some cases, the access control information may comprise a blocked traffic list indicating a type of traffic (or flows) that should be blocked from scheduling.

According to certain aspects, upon receiving the access control information, the UE activates PS DATA and may report the activation using a protocol configuration options (PCO). Thereafter, the UE may receive an acknowledgement (ACK) in response to the reported activation from the packet gateway (PGW). In some cases, the UE may then receive a request to transmit traffic using one or more services. According to aspects, the UE checks a type of the traffic requested to be sent against the access control information and blocks all traffic (e.g., at its protocol stack) associated with a traffic type, or flow, that is not part of the traffic exempt list (i.e., the PS DATA OFF EXEMPT) or that is listed in the blocked traffic list.

According to aspects, for the ACDC-based solution, the access control information may comprise a traffic exempt list indicating a number of ACDC-exempt flows or a blocked traffic list indicating a number of blocked ACDC flows. According to aspects, upon receiving the access control information, the gNB communicating with the UE activates ACDC and may report the ACDC activation using a PCO to the core network such as MME (e.g., in LTE/EPC), AMF (e.g., in a 5G core), or GGSN (e.g., in 3g). Accordingly, upon receiving a request to transmit traffic, the UE may check the type of the traffic against the access control information and may block all traffic (e.g., at the protocol stack in the UE) associated with a traffic type, or flow, that is not part of the traffic exempt list (i.e., ACDC exempt list) or that is listed in the blocked traffic list.

According to aspects, as noted, the traffic exempt list and/or blocked traffic list may include an indication of types of traffic (e.g., flows) which are either allowed or blocked (respectively). In response to a request to transmit traffic associated with a particular flow type, the UE may identify the flow type either by the application layer in the UE directly telling the UE's modem of the flow type or through the use of a UL filter. According to aspects. UL filters may identify the flow type/category based on at least one of a Flow-ID, an application identifier (App ID) associated with a port number for the traffic type/flow requested to be scheduled, or a Token associated with the traffic type/flow requested to be scheduled.

As noted, FIG. 9 illustrates an example flow-based access control mechanism. For example, as illustrated, at step 1, the core network may provide access control information to the UE (e.g., to the NAS layer in the UE), such as a list of Flow IDs, filters, category information, QoS information, etc.

At step 2, the RAN (e.g., a gNB) may provide ACB information to the UE (e.g., to the AS layer in the UE), such as ACB for each category, ACB for NAS, and/or ACB for MMTEL.

At step 3, the flow-category-related ACB information (e.g., ac-BarringFactorFlowCat, ac-BarringTimeFlowCat for each flow category) and NAS-procedure/property-related ACB information (e.g., ac-BarringFactorNAS, ac-BarringTimeNAS per NAS procedure or property) received at step 2 are forwarded from the UE AS layer to the UE NAS layer.

At step 3a, the MMTel related ACB information (e.g., ac-BarringFactorMMTel, ac-BarringTimeMMTel) received at step 2 is forwarded from the UE AS layer to the UE IMS layer.

At step 4, for a user data (IP packet) transmission case, when HLOS generates uplink data, the UE NAS/upper layer performs access control according to the received ACB information at steps 1-3. For example, the UE may identify a flow ID associated with the uplink date, identify a flow category associated with the uplink data and compare the flow ID and flow category with the ACB information. According to aspects, if the data transfer is barred at step 4, the UE NAS/upper layer may request HLOS to suspend the flow so as to not transmit the uplink data. If, however, the data transfer is not barred at step 4, then the UE NAS/upper layer may let UE send the uplink data to the network.

Further, for a NAS procedure initiation case at step 4, the UE NAS layer performs NAS ACB variables check and sends the corresponding uplink NAS message to the network if the check passed.

At step 5, the UE AS performs ACB check according to the received ACB configuration applicable for AS layer.

It should be noted that while FIG. 9 illustrates Flow-ID based filtering, other sets of parameters (e.g., UL TFT, Application ID associated with a port number, token) may be used instead. Additionally, it should be noted that steps 3 and 4*a* in FIG. 9 could be performed either in HLOS or NAS/Upper layer, whereas the example in FIG. 9 shows NAS/Upper layer as an example.

According to certain aspects, for maintaining ACB variables, in LTE, ACB variables for MMTel may be updated by AS per higher layer request. As shown in FIG. 9, it may be assumed that NAS/upperlayer/IMS subscribes for ACB update event. According to aspects, whenever ACB parameters are changed. AS may notify the corresponding NAS, upperlayer or IMS to update the ACB variables.

According to certain aspects, for AS-IMS communication, if IMS is inside the UE's modem, it would be up to implementation to determine how AS-IMS communication should be performed. Otherwise, some API may be offered by modem for IMS. This may also need HLOS change.

According to aspects, for downlink (DL) or mobile terminated (MT) access. ACB may not be assumed to be not applicable.

According to certain aspects, when a new flow is requested to be start, if this new flow does not match to any filters, the new flow may be treated as a default flow, default category on a default data radio bearer (DRB). Thus, according to certain aspects, the ACB parameters may have information associated with the default category.

According to certain aspects, a fifth solution for allowing access control for an idle and connected state, similar to the fourth solution above, may be to enforce access control only when UE generates a new traffic flow, which may require new DRB establishment. A benefit of enforcing access control only when the UE generates a new traffic flow may be that, since DRB addition requires lots of efforts (e.g., resource allocation for the new DRB and RRC connection reconfiguration) in the network, it is beneficial for RAN to be able to restrict such a processing heavy procedure (e.g., when the RAN is congested).

According to aspects, under this fifth solution, the UE may be configured with access control information that includes information for a new DRB establishment restriction. According to certain aspects, the UE may block any traffic associated with a flow that does not have any corresponding DRBs that have already been established in the UE. It should be noted that the UE may try to identify a corresponding DRB to transmit the uplink data (i.e., traffic) when the protocol stack receives the uplink data from the upper layer (HLOS/application layer). At that time, if the UE determines that the traffic requested to be scheduled is not associated with an already-established DRBs, then the AC is enforced and the traffic is blocked from scheduling.

According to certain aspects, in some cases, the RAN may provide AS access control information via system information. Further, if the AS access control information is present, the UE refrains from accessing the RAN for any reason, which implies even NAS registration may be barred by the AS access control information.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for checking, means for scheduling, means for blocking, and/or means for refraining may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIGS. 10-11.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication, the method comprising:
   receiving, by a user equipment (UE) in a radio resource control (RRC) inactive state, a request to transmit traffic using one or more services for communicating with a wireless communications network;
   checking, by the UE in the radio resource control (RRC) inactive state, a type of the traffic against access control information associated with the one or more services; and
   scheduling the traffic for transmission if the type of the traffic satisfies one or more criteria in the access control information based on the checking.

2. An apparatus comprising:
   at least one processor configured to:
      receive, by a user equipment (UE) in a radio resource control (RRC) inactive state, a request to transmit traffic using one or more services for communicating with a wireless communications network;
      check, by the UE in the radio resource control (RRC) inactive state, a type of the traffic against access control information associated with the one or more services; and
      schedule the traffic for transmission if the type of the traffic satisfies one or more criteria in the access control information based on the checking.

3. An apparatus comprising:
   means for receiving, by a user equipment (UE) in a radio resource control (RRC) inactive state, a request to transmit traffic using one or more services for communicating with a wireless communications network;
   means for checking, by the UE in the radio resource control (RRC) inactive state, a type of the traffic against access control information associated with the one or more services; and
   means for scheduling the traffic for transmission if the type of the traffic satisfies one or more criteria in the access control information based on the checking.

4. A non-transitory computer-readable medium having stored thereon instructions that, when executed by at least one processor, cause the at least one processor to:
   receive, by a user equipment (UE) in a radio resource control (RRC) inactive state, a request to transmit traffic using one or more services for communicating with a wireless communications network;
   check, by the UE in the radio resource control (RRC) inactive state, a type of the traffic against access control information associated with the one or more services; and
   schedule the traffic for transmission if the type of the traffic satisfies one or more criteria in the access control information based on the checking.

* * * * *